United States Patent [19]

Sugano et al.

[11] Patent Number: 5,067,075
[45] Date of Patent: Nov. 19, 1991

[54] METHOD OF DIRECT MEMORY ACCESS CONTROL

[75] Inventors: Minoru Sugano; Akira Horiki, both of Yokohama; Zenichi Yashiro, Iruma; Hironori Matsushima, Sapporo, all of Japan

[73] Assignees: Hitachi, Ltd.; Nippon Telegraph & Telephone Corp., both of Tokyo, Japan

[21] Appl. No.: 192,133

[22] Filed: May 10, 1988

[30] Foreign Application Priority Data

May 13, 1987 [JP] Japan .................................. 62-114684

[51] Int. Cl.⁵ .......................................... G06F 13/28
[52] U.S. Cl. .............................. 395/425; 364/239.4; 364/239.7; 364/242.31; 364/240.9; 364/DIG. 1
[58] Field of Search ... 364/200 MS File, 900 MS File

[56] References Cited

U.S. PATENT DOCUMENTS

| 4,180,855 | 12/1979 | Buedel | 364/200 |
| 4,312,066 | 1/1982 | Bantz et al. | 371/16 |
| 4,438,488 | 3/1984 | Shibayama et al. | 364/200 |
| 4,455,620 | 6/1984 | Watanabe et al. | 364/900 |
| 4,458,313 | 7/1984 | Suzuki et al. | 364/200 |

Primary Examiner—Thomas M. Heckler
Attorney, Agent, or Firm—Antonelli, Terry, Stout & Kraus

[57] ABSTRACT

In a system comprising input/output devices, a memory and a control processor, direct memory access information (memory address and data) from an input/output device to the processor is stored temporarily and then a direct memory access request is transmitted to the processor. The processor bus holding time at direct memory access is reduced, and the processing speed of the processor is improved.

9 Claims, 8 Drawing Sheets (DMA WRITE OPERATION)

(INPUT/OUTPUT COMMAND EXECUTION)

(DMA OPERATION AND INPUT/OUTPUT COMMAND EXECUTION IN CONTENTION)

METHOD OF DIRECT MEMORY ACCESS CONTROL

BACKGROUND OF THE INVENTION

This invention relates to a method of direct memory access control for a system comprising input/output devices, a memory and a control processor, such as an electronic switching system, in which the input/output devices send direct memory access requests to the processor.

The direct memory access control between input/output devices and a processor is described, for example, in an article entitled "Architecture of a Distributed Packet Switching System", in the publication "Switching Research", SE84-121, pp. 37-42. In this packet switching system, the line unit as an input/output device has the ability to perform direct memory access. The line unit (input/output device), when making direct memory access, sends a processor bus holding request signal to the processor. Upon receiving the request signal, the processor holds the processor bus which connects the line units to the processor regardless of the time needed for the transmission of direct memory access information (memory address and data) between the line unit and processor, and thereafter grants the line unit a direct memory access to the memory.

In this case, if the transmission of direct memory access information between the line unit and the processor takes a long time, the processor holds the processor bus for a long time at the execution of direct memory access, and therefore the processor cannot access the memory during this period, resulting in a reduction in the processing speed of the processor.

SUMMARY OF THE INVENTION

An object of this invention, which is intended for a system comprising input/output devices, a memory and a control processor, is to reduce the processor bus holding time for direct memory access by an input/output device, thereby improving the processing speed of the processor.

Another object of this invention is to provide a method of direct memory access which involves holding the processor bus for a constant time length regardless of the time needed for the transmission of direct memory access information between input/output devices and the processor.

In order to achieve the above objectives, the inventive method employs first and second buffer registers and associated control circuitry located between the input/output devices and the processor. Direct memory access information (memory address and data) from an input/output device is stored temporarily in the second buffer register, and then is sent to the processor so that it holds the processor bus to grant the direct memory access. An input/output command from the processor to an input/output device is stored temporarily in the first buffer register, and then is sent to the input/output device so that it is executed. The buffer register control issues a direct memory access request signal to the processor after the second buffer register has received all direct memory access information from the input/output device, and the processor responds to the request signal to hold the processor bus. Consequently, direct memory access is carried out merely by holding the processor bus for a constant time length.

DESCRIPTION OF THE PREFERRED EMBODIMENTS

Figure 1:
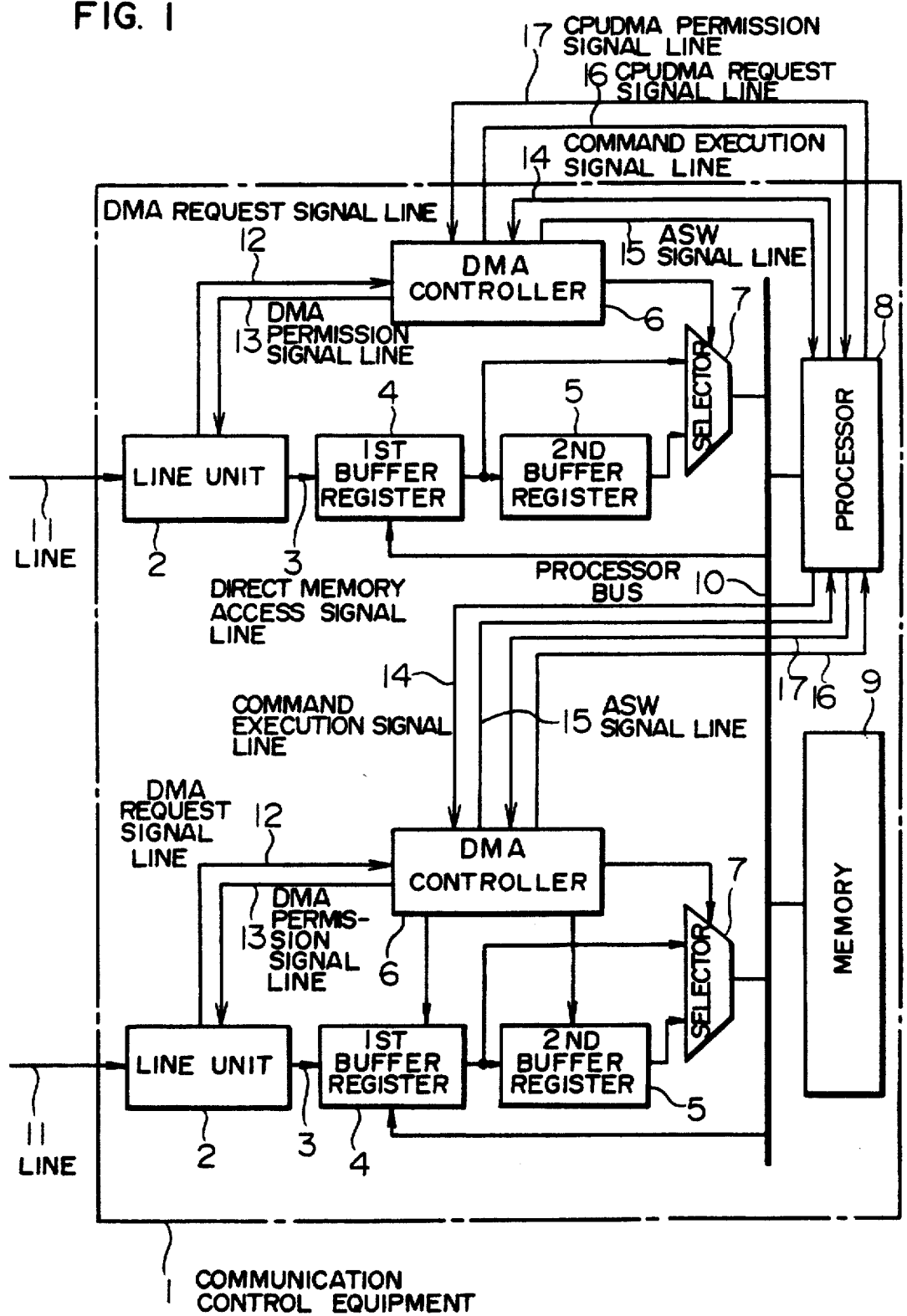
FIG. 1 is a block diagram of the communication control equipment based on this invention.

An embodiment of this invention will now be described with reference to FIGS. 1 through 8. In FIG. 1, indicated by 1 is communication control equipment based on this invention and 2 is a line unit which is an input/output device of the communication control equipment and is designed to provide direct memory access control using LSI devices, etc. in compliance to the CCITT-recommended X.25 protocol. Indicated by 3 is a direct memory access signal line used to transfer a memory address and data between the line unit 2 and processor 8 in a direct memory access mode, 4 is a first buffer register according to this invention, 5 is a second buffer register according to this invention, 6 is a DMA controller which controls the first and second buffer registers and also controls the direct memory access operation, 7 is a selector for switching the buffer registers 4 and 5, 8 is a processor, 9 is a memory, 10 is a processor bus, 11 is a line which connects the terminal equipment to the communication control equipment 1, 12 is a DMA request signal line used to indicate a direct memory access request from the line unit 2 to the DMA controller 6, 13 is a DMA permission signal line used to indicate the permission and completion of direct memory access from the DMA controller 6 to the line unit 2, 14 is a command execution signal line used to indicate the execution an input/output command by the processor 8 to the DMA controller 6, 15 is an ASW signal line used to indicate the reception and completion of input/output command from the DMA controller 6 to the processor 8, 16 is a CPUDMA request signal line from the DMA controller 6 to the processor 8, and 17 is a CPUDMA permission signal line indicating the reception of a CPUDMA request from the processor 8 to the DMA controller 6.

Figure 2:
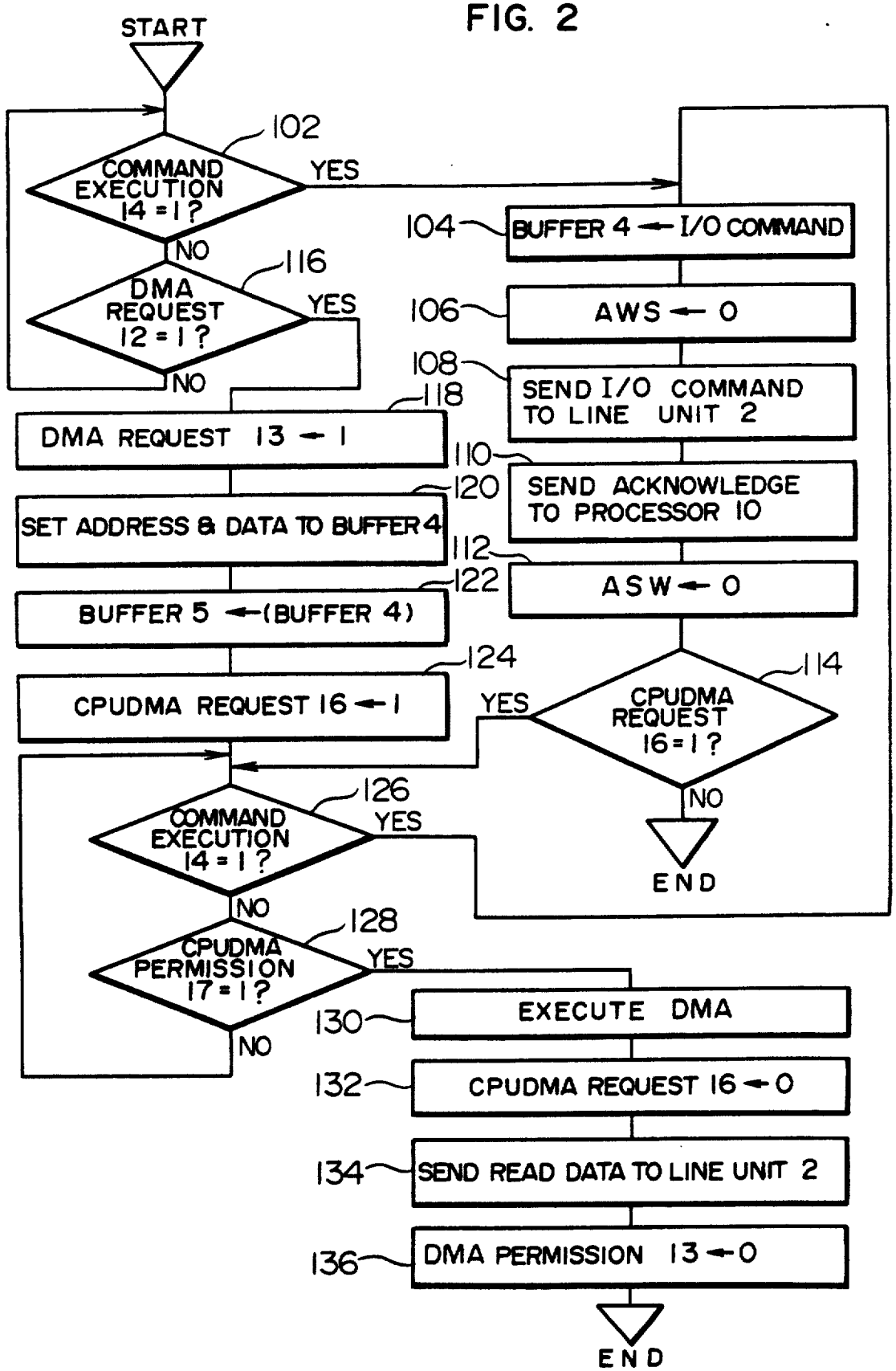
FIG. 2 is a flowchart showing the operation of the communication equipment 1 in FIG. 1.

The following describes the operation of the communication control equipment 1 with reference to the flowchart of FIG. 2. Communication data sent over the line 11 is received by the line unit 2 in the communication controller equipment 1. After processing the received data, the line unit 2 sends a direct memory access request to the DMA controller 6 over the DMA request line 12 so as to request permission to store the data in the memory 9: (step 116). The DMA controller 6, if the first and second buffer registers 4 and 5 are empty and unless an input/output execution command has been issued by the processor 8, sends a signal to the line unit 2 over the DMA permission signal line 13 to indicate the permission of direct memory access: (step 118). The line unit 2 sends the memory address and data (in case of memory writing), which is direct memory access information, to the first buffer register 4 over the direct memory access signal line 3: (step 120).

Figure 3:
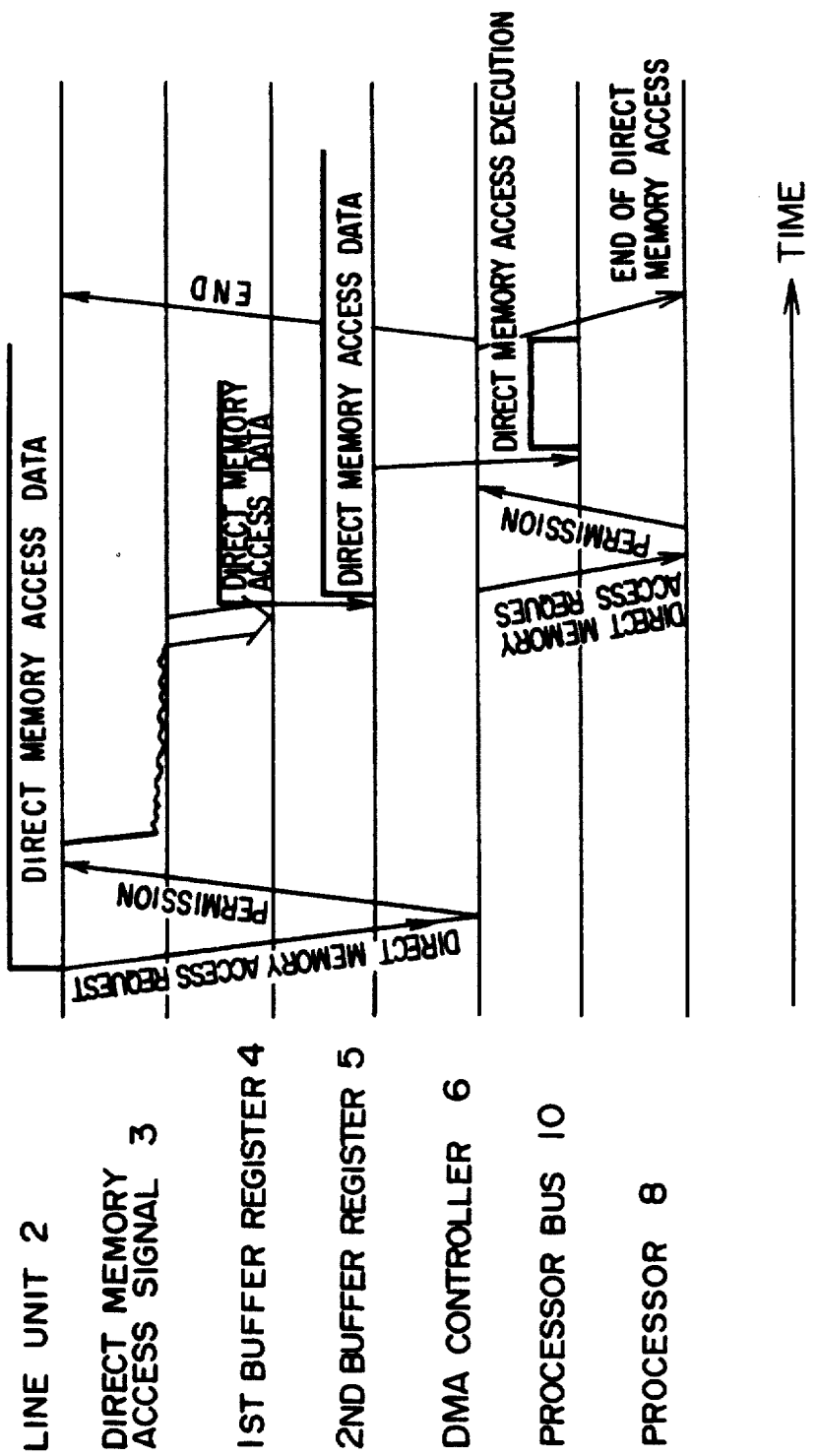
FIG. 3 is a timing chart showing, as an example, the memory write operation in direct memory access mode by the line unit 6 in the communication control equipment 1.

The DMA controller 6, upon setting of the address and data in the first buffer register 4, transfers the contents to the second buffer register 5: (step 122), and issues a direct memory access request to the processor 8 over the CPUDMA request signal line 16: (step 124). The DMA controller 6, upon receiving a direct memory access permission signal from the processor 8 over the CPUDMA permission signal line 17: (step 128), places the memory address and data from the second buffer register 5 on the processor bus 10 by way of the selector 7: (step 130). On completion of access to the memory 9: (step 132), the DMA controller 6 disables the signal on the DMA permission signal line 13, and indicates the end of direct memory access to the line unit 2 to complete the operation: (step 136). FIG. 3 shows an example of the sequence of memory writing operation in direct access mode. The memory reading operation in direct access mode is similar to the above memory writing operation, and the explanation is omitted.

In the case of executing an input/output command issued by the processor 8 to the line unit 2, the processor 8 places the input/output command on the processor bus 10, and then indicates the execution of the input/output command to the DMA controller 6 over the command execution line 14: (step 102). The DMA controller 6 sends a signal over the ASW line 15 to indicate the reception of input/output command execution to the processor 8: (step 106), and, after setting the input/output command on the processor bus 10 in the first buffer register 4: (step 104), transfers the input/output command to the line unit 2: (step 108). Upon receiving the input/output command, the line unit 2 executes it and, in case of the input command, returns acknowledge information to the first buffer register 4. The DMA controller 6, when the acknowledge information has been set in the first buffer register 4, places the contents on the processor bus 10 by way of the selector 7: (step 110), and indicates the end of execution of input/output command to the processor 8 by invalidating the signal on the ASW line 15: (step 112). FIG. 3 shows an example of the sequence of the above input command execution.

Figure 4:
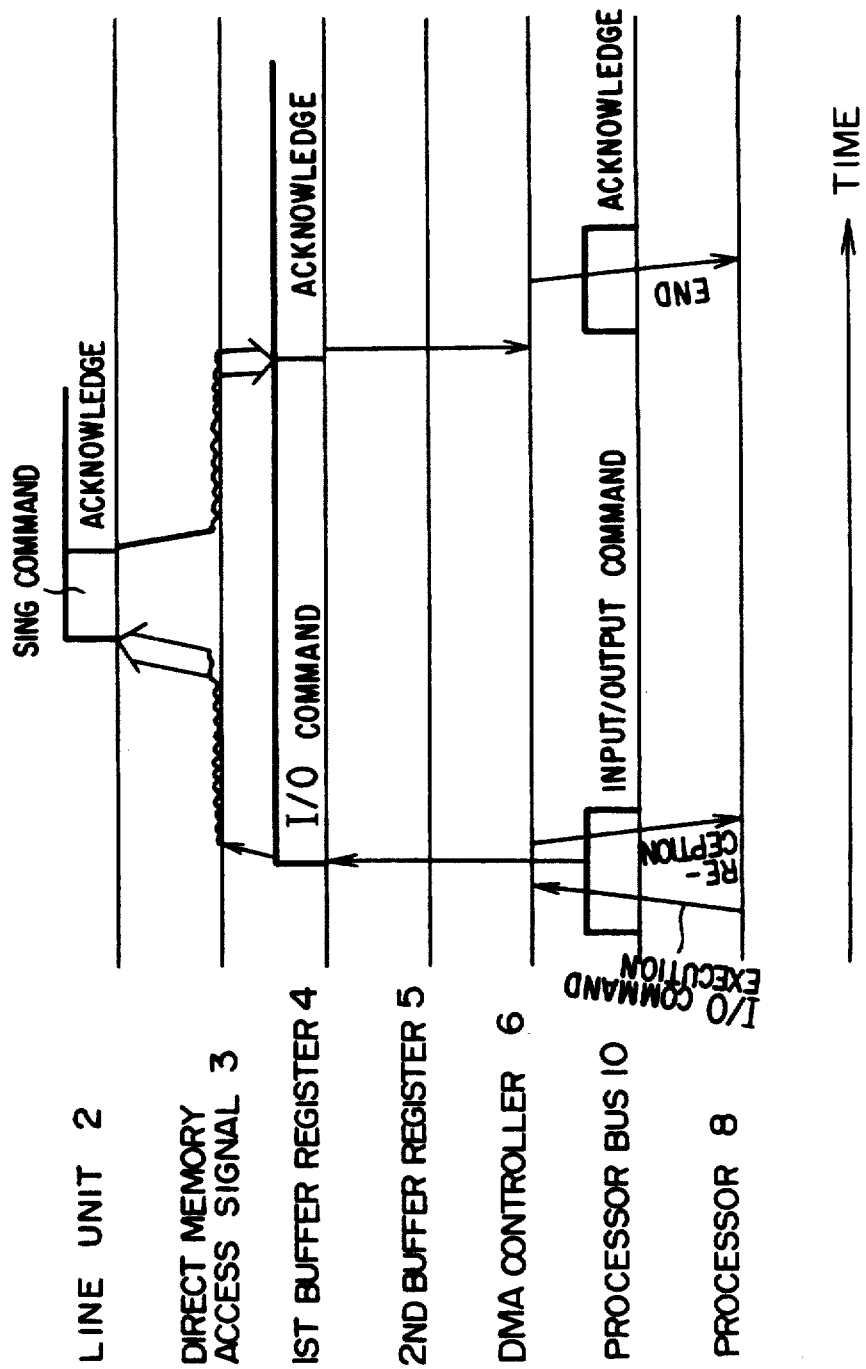
FIG. 4 is a timing chart showing, as an example, the execution by the processor 8 of the input/output command to the line unit 6.
Figure 5:
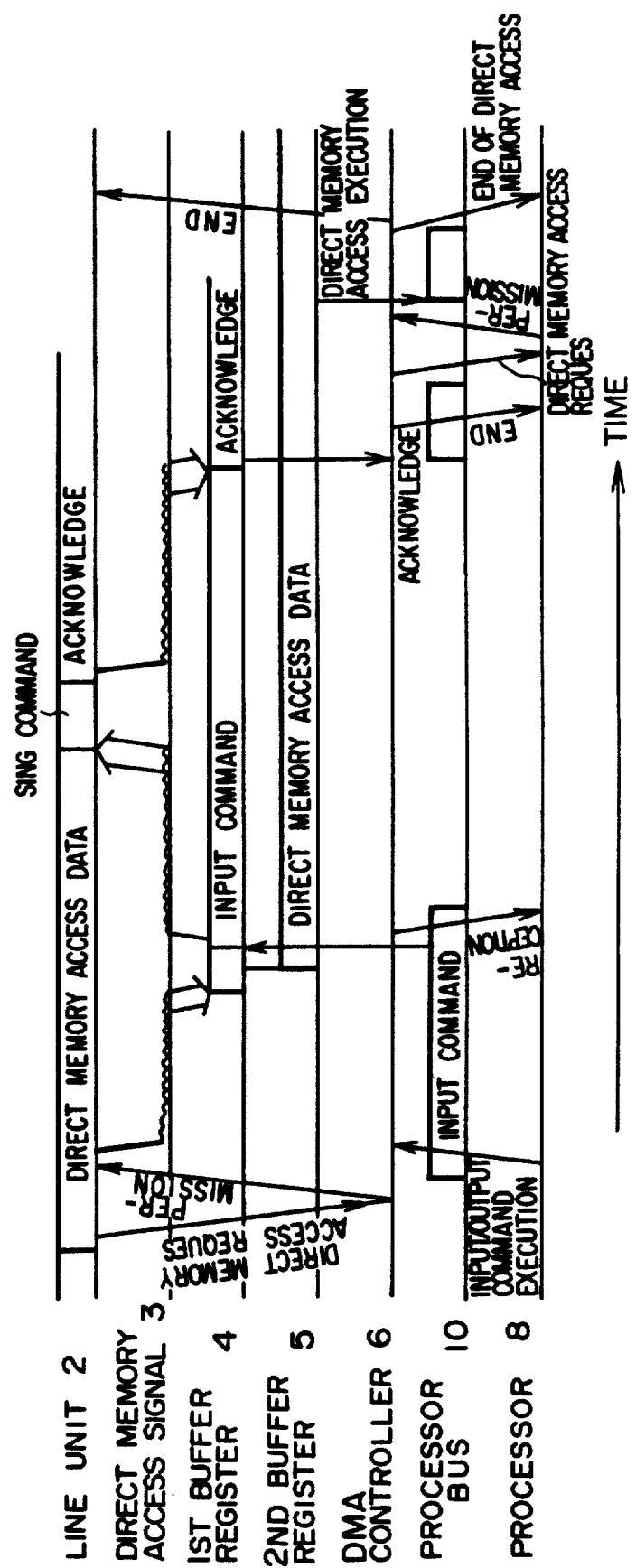
FIG. 5 is a timing chart showing, as an example, the case of bus contention between the direct memory access and input/output command shown in FIGS. 2 and 3.

In case the direct memory access operation taken by the line unit 2 and the input/output command execution taken by the processor 8 contend with each other: (step 126), the DMA controller 6 sets the address and data in the first buffer register 4: (step 120) and, after transferring the contents to the second buffer register 5: (step 122), sends the input/output command from the processor 8 to the line unit 2 using the first buffer register 4: (steps 104–108), and sends acknowledge information, if it is present, to the processor 8 by way of the first buffer register 4: (step 110). After the input/output command is completed, the DMA controller 6 proceeds with the direct memory access operation using the address and data held in the second buffer register 5: (steps 114, 128, 130). FIG. 4 shows an example of the sequence at the occurrence of contention between the memory writing operation in direct memory access mode and the input command execution.

As described above, the DMA controller 6 implements the direct memory access control, input/output command execution control, and their arbitration control.

Figure 6:
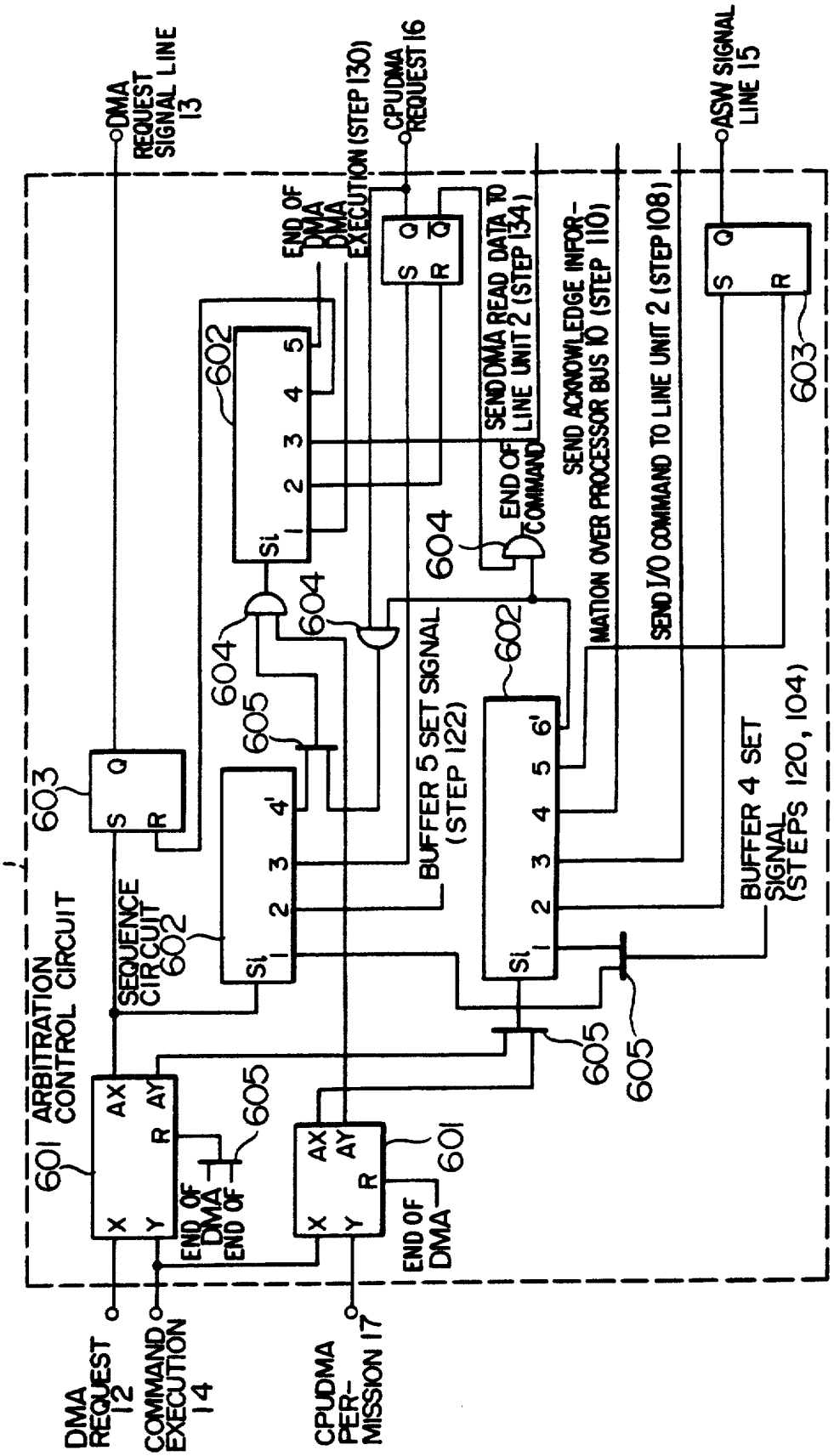
FIG. 6 is a schematic diagram of the DMA control circuit 6 in FIG. 1.
Figure 7:
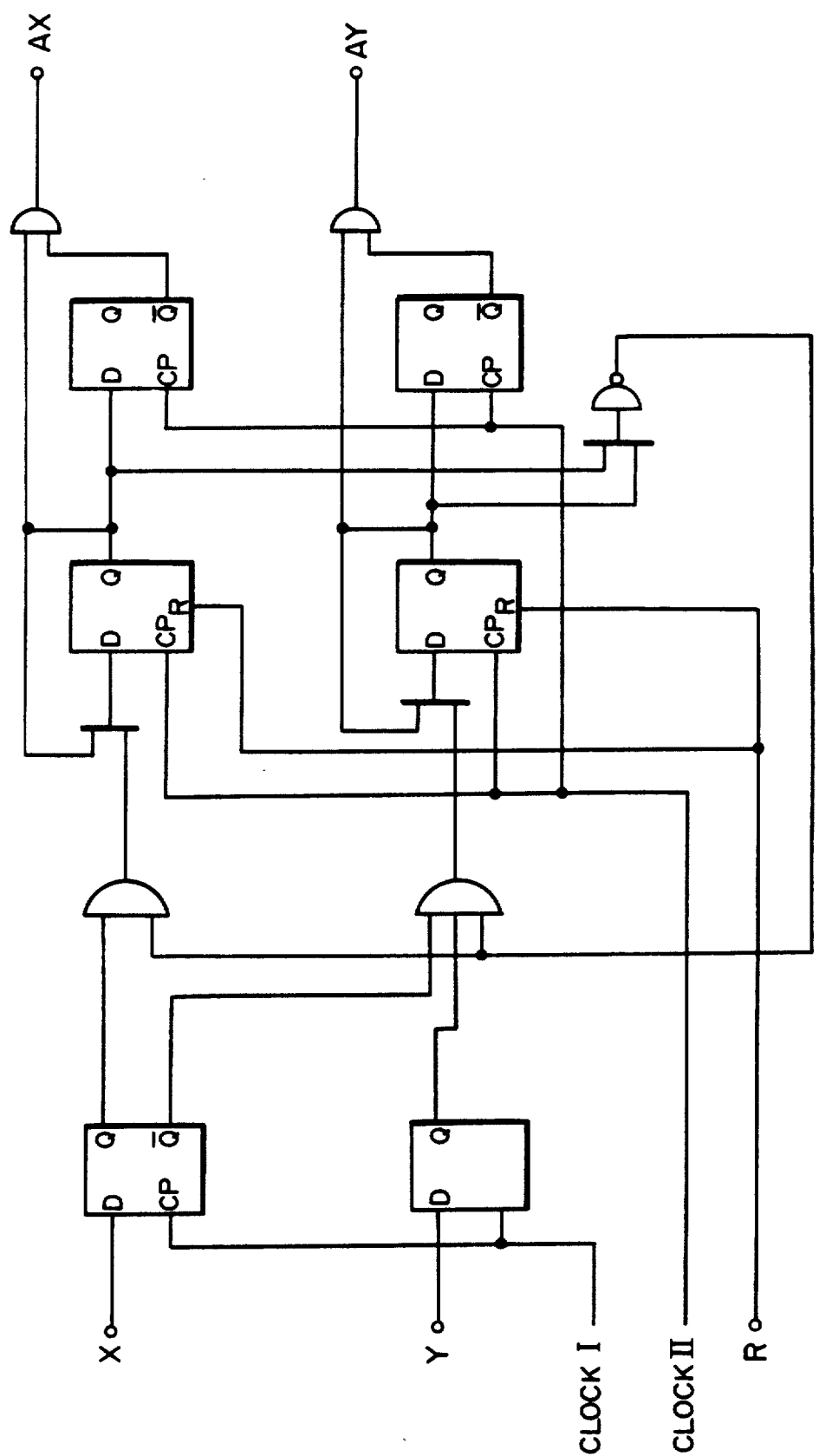
FIG. 7 is a schematic diagram of the bus arbitration control circuit 601 in FIG. 6.
Figure 8:
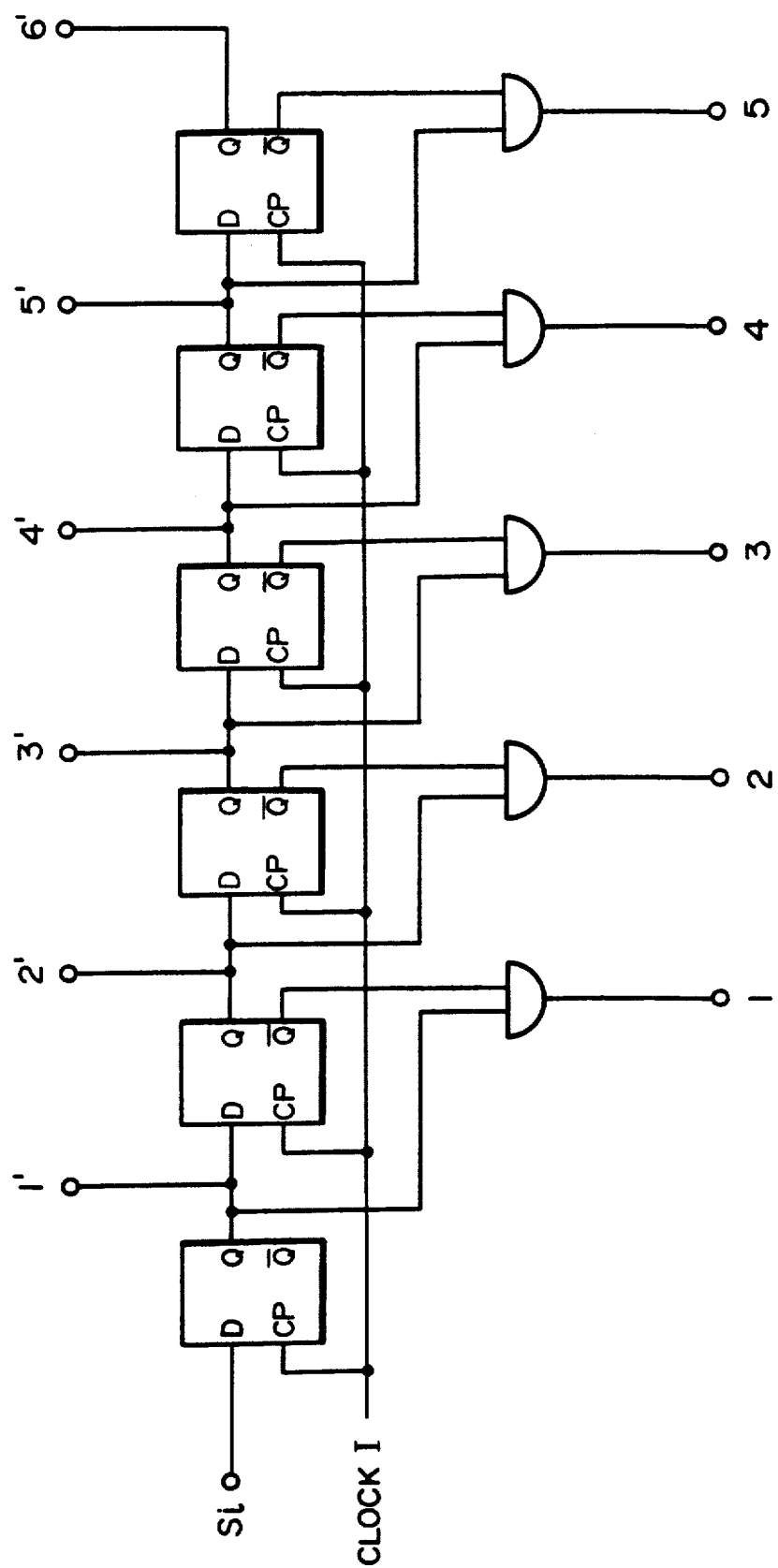
FIG. 8 is a schematic diagram of the sequence control circuit in FIG. 6.

FIG. 6 shows a more detailed arrangement of the DMA controller 6. In the figure, indicated by 601 is a 2-input arbitration control circuit, 602 is a sequence circuit for producing timing signals, 603 is a flip-flop of set-reset type, 604 is an AND gate, and 605 is an OR gate. FIGS. 7 and 8 show the more detailed arrangement of the arbitration control circuit 601 and sequence circuit 602, respectively. The circuit shown in FIG. 6 is to carry out the operation of FIG. 2, although the explanation is omitted. The clocks I and II used in FIGS. 7 and 8 have a 50% duty cycle and are out of phase with each other by 180°. It should be noted that the circuit arrangements shown in FIGS. 6, 7 and 8 are merely examples for realizing the DMA control circuit 6.

According to this embodiment when the transmission of direct memory access information between the line unit 2 and processor 8 has an increased delay time due to an increased length of signal line 3 or due to the serial transmission on the basis of multiplex memory address and data for reducing the number of interface lines, the processor bus 10 at direct memory access has a constant holding time, instead of being affected by the transmission delay, whereby the processing speed of the processor 8 is virtually prevented from falling.

Although in the above description direct memory access information is set in the second buffer register by way of the first buffer register, it is also possible to practice the method by setting the information directly in the second buffer register.

According to this invention, as described above, when the transmission of direct memory access information between the input/output device and processor has an increased delay time due to an increased distance between them or due to the serial transmission on the basis of multiplex address and data lines for reducing the number of interface lines for economy, the processor bus at direct memory access can have a shorter holding time, whereby the processing speed of the processor is prevented from falling.

We claim:

1. For use in a system comprising an input/output device, a memory, a processor for controlling said input/output device and said memory, a processor bus connected to said memory and said processor and means connected between said input/output device and said processor bus for temporarily storing direct memory access information which is to be stored in said memory, a method of controlling direct memory access from said input/output device to said memory via said processor bus, comprising the steps of:

receiving and storing direct memory access information from said input/output device into said temporary storing means via a signal line having a significant delay; thereafter requesting from said processor a right to usage of said processor bus for transmission of direct memory access information after said direct memory access information is stored in said temporary storing means; and transmitting all of the direct memory access information stored in said temporary storing means to said processor bus for storage in said memory.

2. A direct memory access control method according to claim 1, wherein said temporary storing means comprises a buffer register.

3. For use in a system which comprises an input/output device, a memory, a processor, and a processor bus interconnecting said input/output device, said memory and said processor, which system operates in such a way that said input/output device issues a direct memory access request to said processor and, when said processor grants the direct memory access request, direct access is made to said memory through said processor bus for storing direct memory access information in said memory, a method of direct memory access control comprising the steps of:

transmitting and storing temporarily an input/output command from said processor to said input/output device in a first buffer register;
   transmitting and temporarily storing direct memory access information to be sent from said input/output device to said memory in a second buffer register;
   transmitting the input/output command from said first buffer register to said input/output device; and thereafter
   requesting from said processor a right to usage of said processor bus for transmission of direct memory access information; and
   transmitting the direct memory access information from said second buffer register to said memory via said processor bus.

4. A method of direct memory access control comprising the steps of:

storing an input/output command from a processor to an input/output device in a first buffer register;
   storing direct memory access information to be transmitted from said input/output device to a memory temporarily in a second buffer register;
   transmitting a direct memory access request from control means for said buffer registers to said processor after all direct memory access information is stored in said second buffer register;
   granting the direct memory access by sending a permission signal from said processor to said control means;
   sending the input/output command stored in said first buffer register to said input/output device; and thereafter
   requesting from said processor a right to usage of said processor bus for transmission of direct memory access information; and
   transmitting said direct memory access information from said second buffer register to said memory after completion of the sending of said input/output command to said input/output device.

5. A direct memory access control method according to claim 3, wherein said storing of direct memory access information in said second buffer register is carried out prior to said storing of an input/output command in said first buffer register.

6. In a system comprising an input/output device, a memory and a processor for controlling said input/output device and memory, a method of controlling direct memory access from said input/output device to said memory, wherein storage means for temporarily storing direct memory access information is provided between said input/output device and said processor, said method comprising the steps of:

receiving and storing direct memory access information from said input/output device in said storage means via a signal line having a significant delay;
   sending a direct memory access request to said processor to initiate direct memory access between said storage means and said memory only after all direct memory access information has been received and stored in said storage means; and
   transmitting the direct memory access information in said storage means to said memory.

7. A direct memory access control method according to claim 6, wherein said storage means comprises a buffer register.

8. A method of direct memory access for a system which comprises an input/output device, a memory, a processor, and a processor bus connecting said system components, and which operates in such a way that said input/output device issues a direct memory access request to said processor, and, when said processor grants the request, direct access to said memory through said processor bus is effected, said method comprising the steps of:

obtaining a usage right for said processor bus and transmitting and storing temporarily an input/output device controlling command from said processor to said input/output device in a first buffer register;
   transmitting and temporarily storing direct memory access information from said input/output device to said memory in a second buffer register;
   transmitting the input/output device controlling command from said first buffer register to said input/output device;
   terminating the execution of the input/output device controlling command and sending a usage right for said processor bus to a means for controlling said first and second buffer registers; and
   effecting direct memory access execution by transmitting the direct memory access information from said second buffer register to said memory.

9. A method of direct memory access control comprising the steps of:

storing an input/output device controlling command being sent from a processor to an input/output device in a first buffer register;
   storing direct memory access information being sent from said input/output device to said memory in a second buffer registers;
   transmitting a direct memory access request from control means for said first and second buffer registers to said processor;
   granting the direct memory access by giving the usage right for the processor bus to said means for controlling said first and second buffer registers;
   transmitting the input/output device controlling command from said first buffer register to said input/output device;
   executing the input/output device controlling command from said processor to said input/output device; and
   transmitting said direct memory access information from said second buffer register to said memory after termination of the execution of said input/output device controlling command.

* * * * *